(12) United States Patent
Yang et al.

(10) Patent No.: US 8,730,687 B2
(45) Date of Patent: *May 20, 2014

(54) SWITCHING CONTROLLER WITH VALLEY-LOCK SWITCHING AND LIMITED MAXIMUM FREQUENCY FOR QUASI-RESONANT POWER CONVERTERS

(75) Inventors: Ta-Yung Yang, Mulpitas, CA (US); Chao-Chih Lin, Taoyuan County (TW)

(73) Assignee: System General Corporation, Taipei Hsien (TW)

( * ) Notice: Subject to any disclaimer, the term of this patent is extended or adjusted under 35 U.S.C. 154(b) by 263 days.

This patent is subject to a terminal disclaimer.

(21) Appl. No.: 13/293,276

(22) Filed: Nov. 10, 2011

(65) Prior Publication Data

US 2012/0230064 A1 Sep. 13, 2012

Related U.S. Application Data

(60) Provisional application No. 61/450,642, filed on Mar. 9, 2011.

(51) Int. Cl.
*H02M 3/335* (2006.01)

(52) U.S. Cl.
USPC .................. 363/21.02; 363/21.16; 323/235

(58) Field of Classification Search
USPC .......... 363/21.02, 21.03, 21.13, 21.16, 21.18; 323/235
See application file for complete search history.

(56) References Cited

U.S. PATENT DOCUMENTS 8,488,338 B2 * 7/2013 Yang et al. ............... 363/21.02

* cited by examiner

*Primary Examiner* — Timothy J Dole
*Assistant Examiner* — Matthew Grubb
(74) *Attorney, Agent, or Firm* — Bacon & Thomas, PLLC

(57) ABSTRACT

The present invention provides a controller for a power converter. The controller comprises a PWM circuit, a detection circuit, a signal generator, an oscillation circuit, a valley-lock circuit, a timing circuit and a burst circuit. The PWM circuit generates a switching signal coupled to switch a transformer of the power converter. A feedback signal is coupled to control and disable the switching signal. The detection circuit is coupled to the transformer via a resistor for generating a valley signal in response to a waveform obtained from the transformer. The signal generator is coupled to receive the feedback signal and the valley signal for generating an enabling signal. The oscillation circuit generates a maximum frequency signal. The maximum frequency signal associates with the enabling signal to generate a turning-on signal. The turning-on signal is coupled to enable the switching signal. A maximum frequency of the turning-on signal is limited.

16 Claims, 12 Drawing Sheets

SWITCHING CONTROLLER WITH VALLEY-LOCK SWITCHING AND LIMITED MAXIMUM FREQUENCY FOR QUASI-RESONANT POWER CONVERTERS

CROSS REFERENCE TO RELATED APPLICATIONS

This application claims the benefit of U.S. Provisional Application No. 61/450,642, filed on Mar. 9, 2011, the contents of which are incorporated herein by reference.

BACKGROUND OF THE INVENTION

1. Field of the Invention

The present invention generally relates to power converters; more specifically, the present invention relates to quasi-resonant power converters.

2. Description of the Related Art

To achieve higher efficiency and reduce power loss of a power converter under high switching frequency, quasi-resonant (QR) technique is widely applied. However, one drawback of the QR power converter is lower efficiency under light-load condition. The switching frequency of QR power converter is varied in response to an input voltage and an output load of the QR power converter. Its switching frequency is normally increased when the output load is decreased. Acoustic noise might be generated during the valley switching operation, which becomes a main issue to be resolved.

The operative description of QR power converter can be found in the prior art:

"Switching Control Circuit Having a Valley Voltage Detector to Achieve Soft Switching for a Resonant Power Converter", U.S. Pat. No. 7,426,120.

BRIEF SUMMARY OF THE INVENTION

The present invention provides a controller for a power converter. The controller comprises a PWM circuit, a detection circuit, a signal generator, an oscillation circuit, a valley-lock circuit, a timing circuit and a burst circuit. The PWM circuit generates a switching signal coupled to switch a transformer of the power converter. A feedback signal is coupled to control and disable the switching signal. The detection circuit is coupled to the transformer via a resistor for generating a valley signal in response to a waveform obtained from the transformer. The signal generator is coupled to receive the feedback signal and the valley signal for generating an enabling signal. The oscillation circuit generates a maximum frequency signal. The maximum frequency signal associates with the enabling signal to generate a turning-on signal. The turning-on signal is coupled to enable the switching signal. The feedback signal is correlated to an output load of the power converter. A maximum frequency of the turning-on signal is limited.

The valley-lock circuit and the timing circuit are coupled to receive the valley signal for providing a hysteresis characteristic for the enabling signal. The burst circuit is coupled to receive the feedback signal for generating a burst signal to disable the switching signal. The burst circuit generates the burst signal in response to a hysteresis-threshold signal. An off time of the switching signal is increased in response to a decrement of the feedback signal.

The present invention also provides a method for controlling a quasi-resonant (QR) power converter. The method comprises generating a switching signal coupled to switch a transformer of the QR power converter; generating a reset signal in response to a feedback signal; generating a valley signal in response to a waveform obtained from the transformer during an off time of the switching signal; generating a maximum frequency signal; generating an enabling signal in response to the feedback signal and the valley signal; and generating a turning-on signal in response to the enabling signal and the maximum frequency signal. The reset signal is coupled to disable the switching signal. The turning-on signal is coupled to enable the switching signal. The feedback signal is correlated to an output load of the QR power converter. The valley signal is generated via a resistor coupled to the transformer. The method further comprises providing a hysteresis characteristic for the enabling signal by a timing circuit. The timing circuit provides the hysteresis characteristic in response to the valley signal. The timing circuit provides the hysteresis characteristic by programming a threshold or a time constant of the timing circuit. The method further comprises generating an overflow signal in response to the valley signal. The turning-on signal is generated in response to the feedback signal when the overflow signal is generated without being synchronized by the valley signal. The method further comprises generating a burst signal in response to the feedback signal. The burst signal is coupled to disable the switching signal. The burst signal is generated in response to the feedback signal and a hysteresis-threshold signal. The off time of the switching signal is increased in response to a decrement of the feedback signal.

The present invention also provides a method for switching a power converter. The method comprises generating a switching signal coupled to switch a transformer of the power converter; generating a reset signal in response to a feedback signal; generating a valley signal in response to a waveform obtained from the transformer during an off time of the switching signal; generating a turning-on signal in response to the feedback signal and the valley signal; providing a hysteresis characteristic for the turning-on signal. The reset signal is coupled to disable the switching signal. The turning-on signal is coupled to enable the switching signal. The feedback signal is correlated to an output load of the power converter. The hysteresis characteristic is provided by a timing circuit in response to the valley signal. The method further comprises generating a timing signal to generate the turning-on signal. A period of the timing signal is increased in response to a decrement of the feedback signal. The valley signal is generated via a resistor coupled to the transformer. The method further comprises generating an overflow signal in response to the valley signal. The overflow signal is coupled to disable a valley switching operation of the power converter. The turning-on signal is generated in response to the feedback signal when the overflow signal is generated without being synchronized by the valley signal.

It is therefore an object of the present invention to provide a controller for a quasi-resonant power converter that can limit the maximum switching frequency and achieve valley switching operation under both heavy-load and light-load conditions. Therefore, high efficiency of the quasi-resonant power converter can be achieved over full-range load conditions.

It is also another object of the present invention to provide a controller for the quasi-resonant power converter with valley-lock function, which is beneficial to reduce the acoustic noise of the transformer during a valley number of the valley switching operation is changing.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
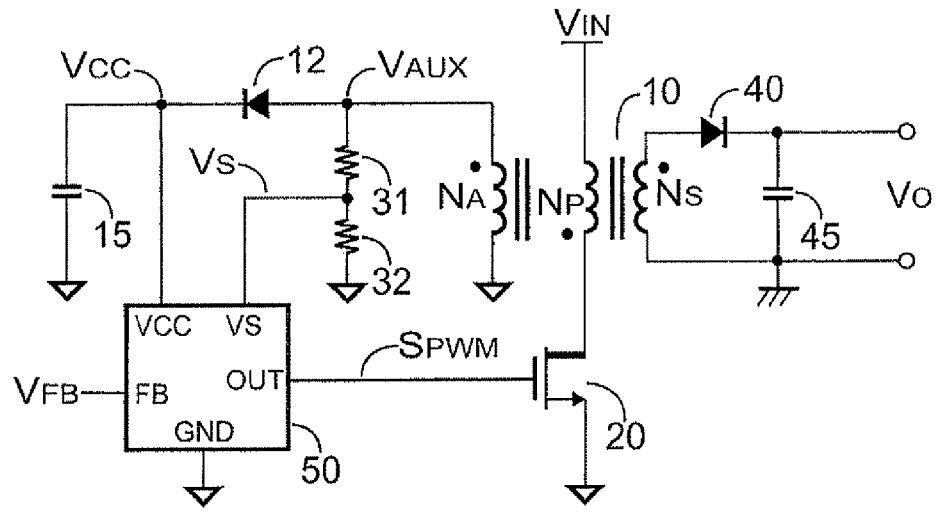
FIG. 1 shows a quasi-resonant (QR) power converter.

FIG. 1 shows a quasi-resonant power converter. A transformer 10 has an auxiliary winding $N_A$, a primary winding $N_P$ and a secondary winding $N_S$. The primary winding $N_P$ is coupled to an input voltage $V_{IN}$. The secondary winding $N_S$ generates an output voltage $V_O$ via a rectifier 40 and a capacitor 45. In order to regulate the output voltage $V_O$, a controller 50 generates a switching signal $S_{PWM}$ to switch the transformer 10 via a power transistor 20. A feedback signal $V_{FB}$ is correlated to the output $V_O$ of the power converter. The feedback signal $V_{FB}$ is coupled to the controller 50 to generate the switching signal $S_{PWM}$ which is utilized to regulate the output voltage $V_O$ of the power converter. A reflected voltage $V_{AUX}$ obtained across the auxiliary winding $N_A$ can be expressed as:

$$V_{AUX} = \frac{T_A}{T_S} \times V_O \qquad (1)$$

where $T_A$ and $T_S$ are respectively the winding turns of the auxiliary winding $N_A$ and the secondary winding $N_S$ of the transformer 10.

A voltage divider is formed by resistors 31 and 32. The voltage divider divides the reflected voltage $V_{AUX}$ into a detection voltage $V_S$ which is supplied to a detection terminal VS of the controller 50. The detection voltage $V_S$ can be shown as:

$$V_S = \frac{R_{32}}{R_{31} + R_{32}} \times V_{AUX} \qquad (2)$$

where $R_{31}$ and $R_{32}$ are respectively the resistance of resistors 31 and 32.

The detection voltage $V_S$ is also correlated to a demagnetizing time $T_S$ of the transformer 10 and the voltage $V_{DS}$ (the drain-to-source voltage) of the power transistor 20. Therefore, the switching signal $S_{PWM}$ is generated in response to the detection voltage $V_S$ to achieve valley switching operation for the power transistor 20.

Figure 2A:
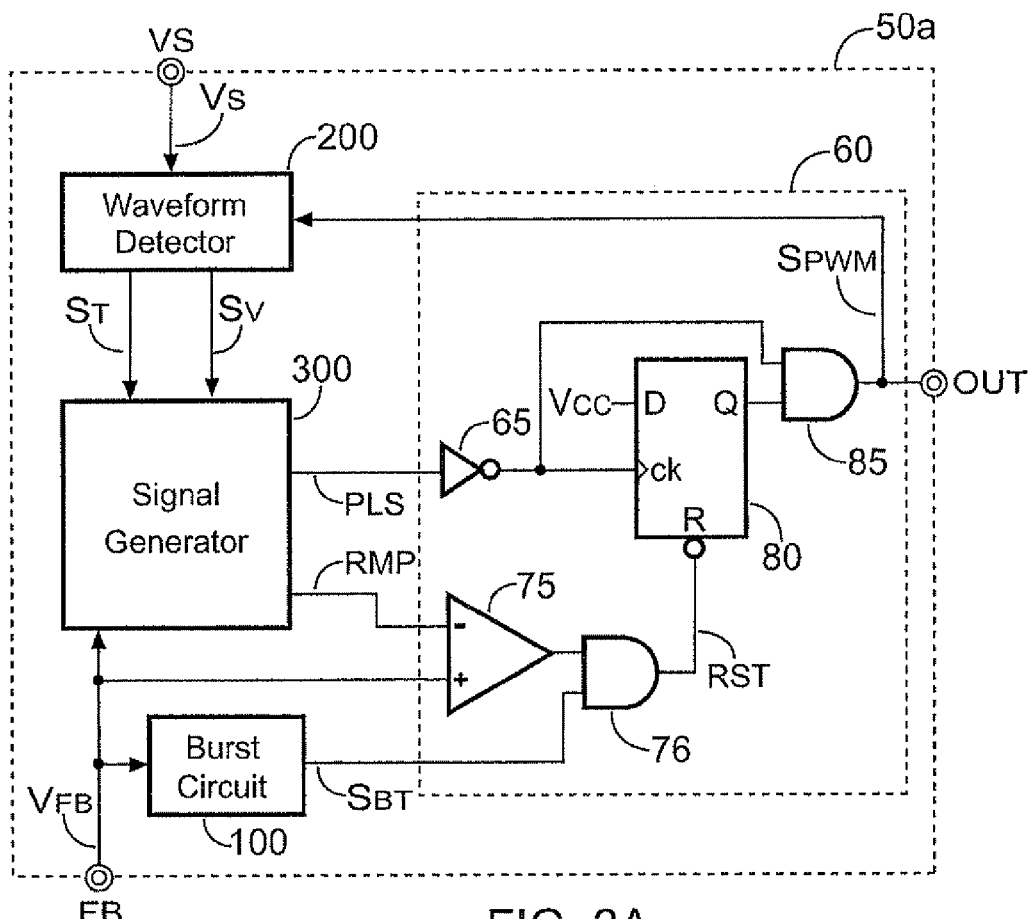
FIG. 2A shows an embodiment of a controller of the quasi-resonant power converter according to the present invention.

FIG. 2A shows an embodiment of the controller 50 of the quasi-resonant power converter according to the present invention. The controller in this embodiment is denoted as 50a. The controller 50a comprises a burst circuit 100, a waveform detector 200, a signal generator 300 and a PWM circuit 60. The PWM circuit 60 comprises a flip-flop 80, an AND gate 85, an inverter 65, an AND gate 76 and a comparator 75. The controller 50a generates a switching signal $S_{PWM}$ coupled to switch the transformer 10. The burst circuit 100 receives the feedback signal $V_{FB}$ to generate a burst signal $S_{BT}$ for disabling the switching signal $S_{PWM}$ when the level of the feedback signal $V_{FB}$ is lower than a hysteresis-threshold signal $V_T$. The signal generator 300 generates a ramp signal RMP coupled to the comparator 75. The ramp signal RMP associates with the feedback signal $V_{FB}$ generate a reset signal RST at the output of the AND gate 76. The reset signal RST is coupled to disable the switching signal $S_{PWM}$. The waveform detector 200, which is a detection circuit, is coupled to the transformer 10 via the detection terminal VS of the controller 50a for generating a valley signal $S_V$ and a discharging-time signal $S_T$ in response to the waveform obtained from the transformer 10. The aforementioned waveform is correlated to the reflected voltage $V_{AUX}$, which is also correlated to the detection voltage $V_S$. The signal generator 300 is coupled to receive the feedback signal $V_{FB}$, the valley signal $S_V$ and the discharging-time signal $S_T$ for generating a pulse signal (turning-on signal) PLS. The pulse signal PLS is coupled to enable the switching signal $S_{PWM}$ by clocking the flip-flop 80. An output of the flip-flip 80 is connected to an input of the AND gate 85 for generating the switching signal $S_{PWM}$. Another input of the AND gate 85 receives the pulse signal PLS via the inverter 65 to limit the maximum duty of the switching signal $S_{PWM}$.

Figure 2B:
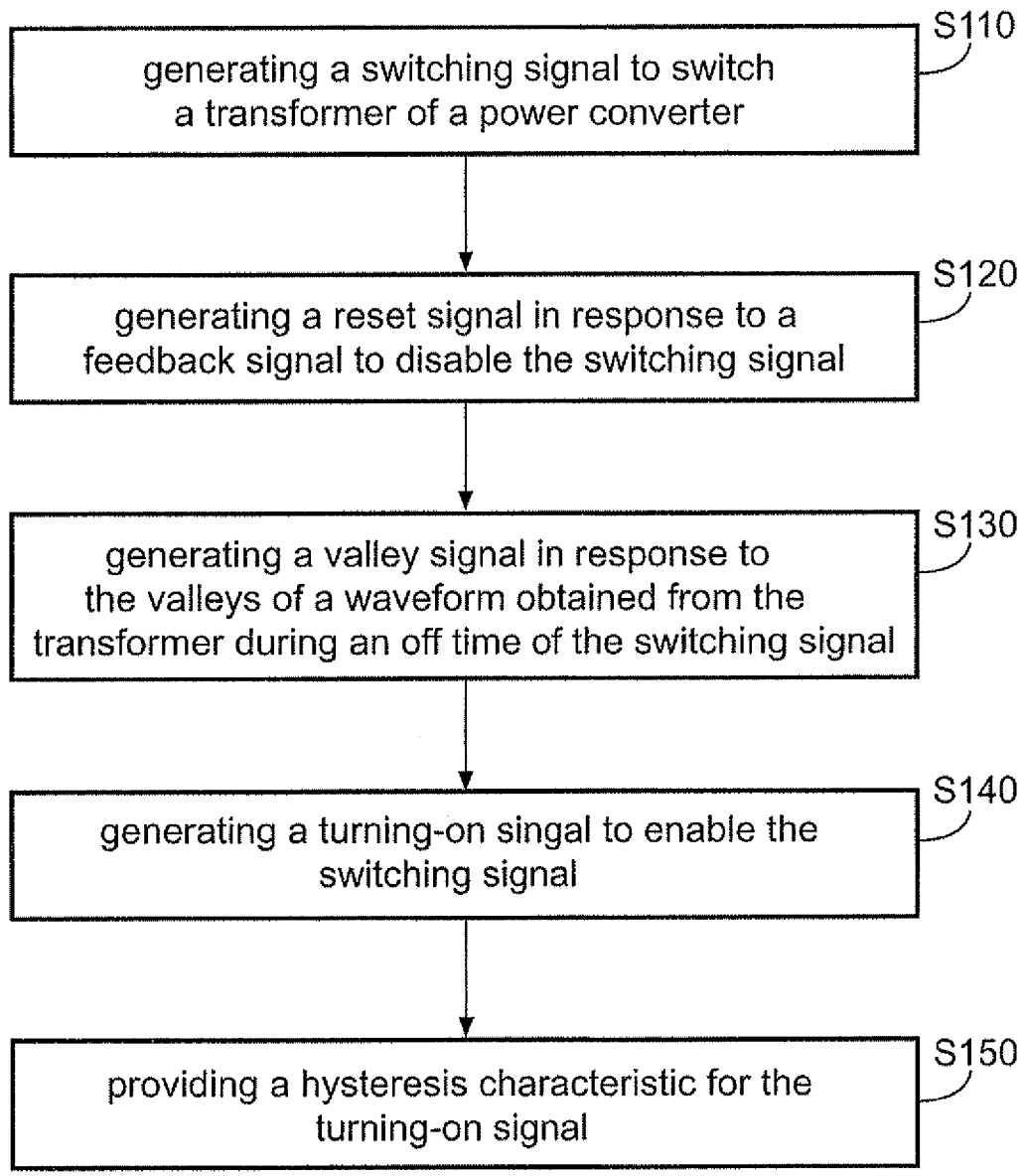
FIG. 2B shows a flowchart of a method for controlling the quasi-resonant power converter according to the present invention.

FIG. 2B shows a flowchart of a method for controlling the quasi-resonant power converter according to the present invention. The method comprises the steps of generating a switching signal to switch a transformer of a power converter; generating a reset signal in response to a feedback signal to disable the switching signal; generating a valley signal in response to the valleys of a waveform obtained from the transformer during an off time of the switching signal; generating a turning-on signal to enable the switching signal; and providing a hysteresis characteristic for the turning-on signal.

Figure 3:
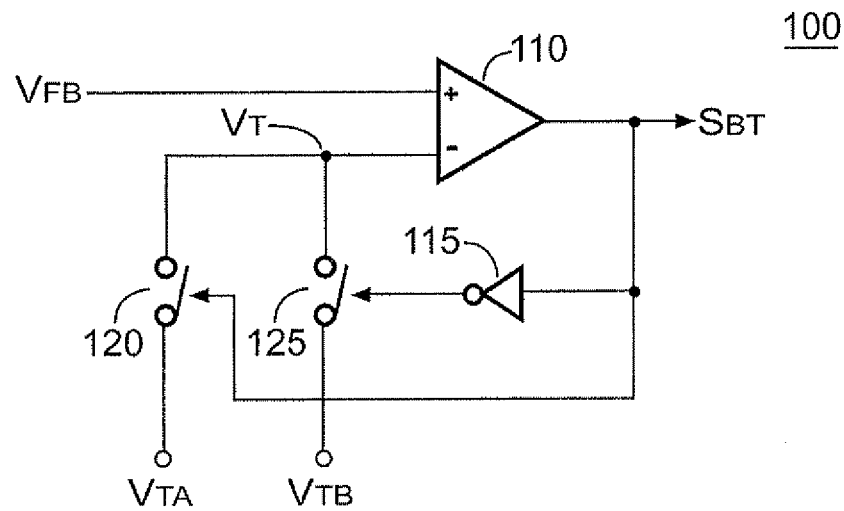
FIG. 3 shows an embodiment of a burst circuit of the controller according to the present invention.

FIG. 3 shows an embodiment of the burst circuit 100 of the controller 50a according to the present invention. The burst circuit 100 comprises a comparator 110 and a hysteresis circuit. A positive terminal of the comparator 110 receives the feedback signal $V_{FB}$. A negative terminal of the comparator 110 receives the hysteresis-threshold signal $V_T$ which is provided by the hysteresis circuit. The hysteresis circuit comprises an inverter 115 and switches 120 and 125. As the burst signal $S_{BT}$ is enabled, the switch 120 will be turned on and the switch 125 will be turned off. The hysteresis-threshold signal $V_T$ will equal to a reference voltage $V_{TA}$ which is coupled to the switch 120. As the burst signal $S_{BT}$ is disabled, the switch 125 will be turned on via the inverter 115 and the switch 120 will be turned off. The hysteresis-threshold signal $V_T$ will equal to a reference voltage $V_{TB}$ which is coupled to the switch 125. The level of the reference voltage $V_{TA}$ is lower than that of the reference voltage $V_{TB}$. The reference voltages $V_{TA}$ and $V_{TB}$ provide the hysteresis-threshold signal $V_T$ a hysteresis characteristic for generating the burst signal $S_{BT}$ by comparing the feedback signal $V_{FB}$ with the hysteresis-threshold signal $V_T$.

Figure 4:
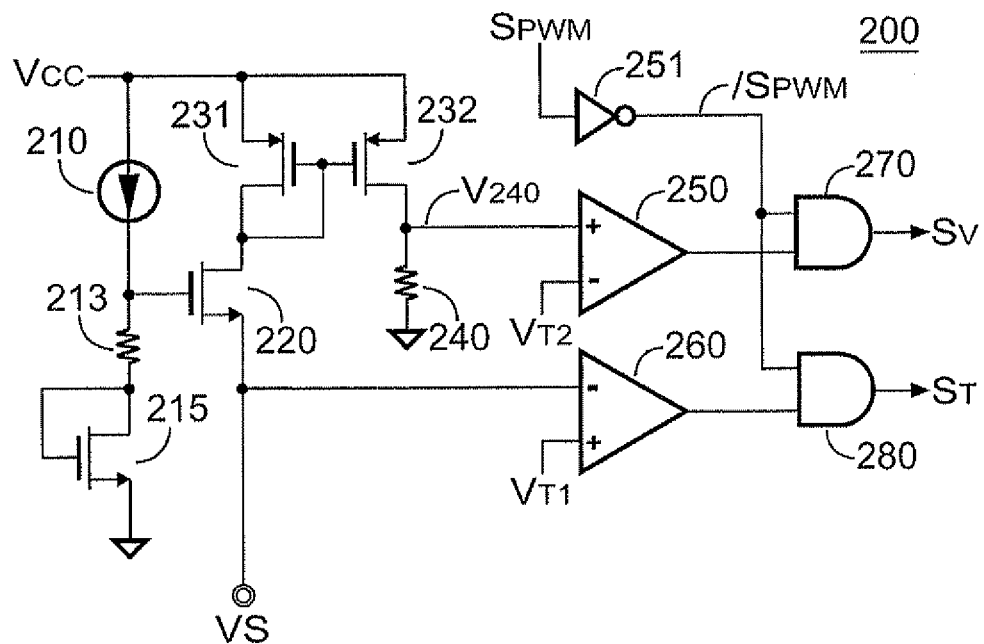
FIG. 4 shows an embodiment of a waveform detector of the controller according to the present invention.

FIG. 4 shows an embodiment of the waveform detector 200 of the controller 50a according to the present invention. The waveform detector 200 comprises a voltage clamping circuit, a current detection circuit and a signal generator. The voltage clamping circuit comprises a current source 210, a resistor 213, a transistor 215 and a transistor 220. The current source 210 is connected between a supply voltage $V_{CC}$ and a gate of the transistor 220. The resistor 213 is connected between the gate of the transistor 220 and a drain of the transistor 215. A gate and the drain of the transistor 215 are connected together. A source of the transistor 215 is connected to a ground reference. A source of the transistor 220 is connected to the detection terminal VS. The detection terminal VS is coupled to the transformer 10 via the voltage divider to receive the detection voltage $V_S$. The voltage clamping circuit clamps a minimum magnitude ($V_{S(MIN)}$) of the detection voltage $V_S$. A turn-on threshold voltage of the transistor 215 is chosen to be correlated to that of the transistor 220. A current of the current source 210 and the resistance of the resistor 213 determine the minimum magnitude ($V_{S(MIN)}$) of the detection voltage $V_S$ at the detection terminal VS. The minimum magnitude ($V_{S(MIN)}$) of the detection voltage $V_S$ can be expressed as:

$$V_{S(MIN)} = -\left(V_{in} \times \frac{N_a}{N_p} \times \frac{R_{32}}{R_{31} + R_{32}}\right) \qquad (3)$$

where $V_{in}$, is the input voltage of the quasi-resonant power converter.

The current detection circuit comprises transistors 231, 232 and a resistor 240. The transistors 231 and 232 form a current mirror. An input of the current mirror is connected to a drain of the transistor 220. The resistor 240 is connected to an output of the current mirror. The current detection circuit generates a current signal $V_{240}$ across the resistor 240 in response to a current sourced to the detection terminal VS. The signal generator comprises comparators 250, 260, an inverter 251 and AND gates 270, 280. A positive terminal of the comparator 250 receives the current signal $V_{240}$. A negative terminal of the comparator 250 is supplied with a threshold voltage $V_{T2}$. A negative terminal of the comparator 260 is connected to the detection terminal VS. A positive terminal of the comparator 260 is supplied with a threshold voltage $V_{T1}$. A first input of the AND gate 270 and a first input of the AND gate 280 are supplied with a reversed switching signal $/S_{PWM}$ from an output of the inverter 251. A second input of the AND gate 270 and a second input of the AND gate 280 are respectively connected to an output of the comparator 250 and an output of the comparator 260. An output of the AND gate 270 generates the valley signal $S_v$ in response to this current signal $V_{240}$. When the current signal $V_{240}$ is higher than the threshold signal $V_{T2}$ and the switching signal $S_{PWM}$ is being disabled, the valley signal $S_V$ will be enabled. When the detection voltage $V_S$ at the detection terminal VS is lower than the threshold voltage $V_{T1}$ and the switching signal $S_{PWM}$ is being disabled, the discharging-time signal $S_T$ will be enabled. The discharging-time signal $S_T$ indicating a demagnetized time of the transformer 10 is utilized to achieve the quasi-resonant switching for the power converter.

Figure 5A:
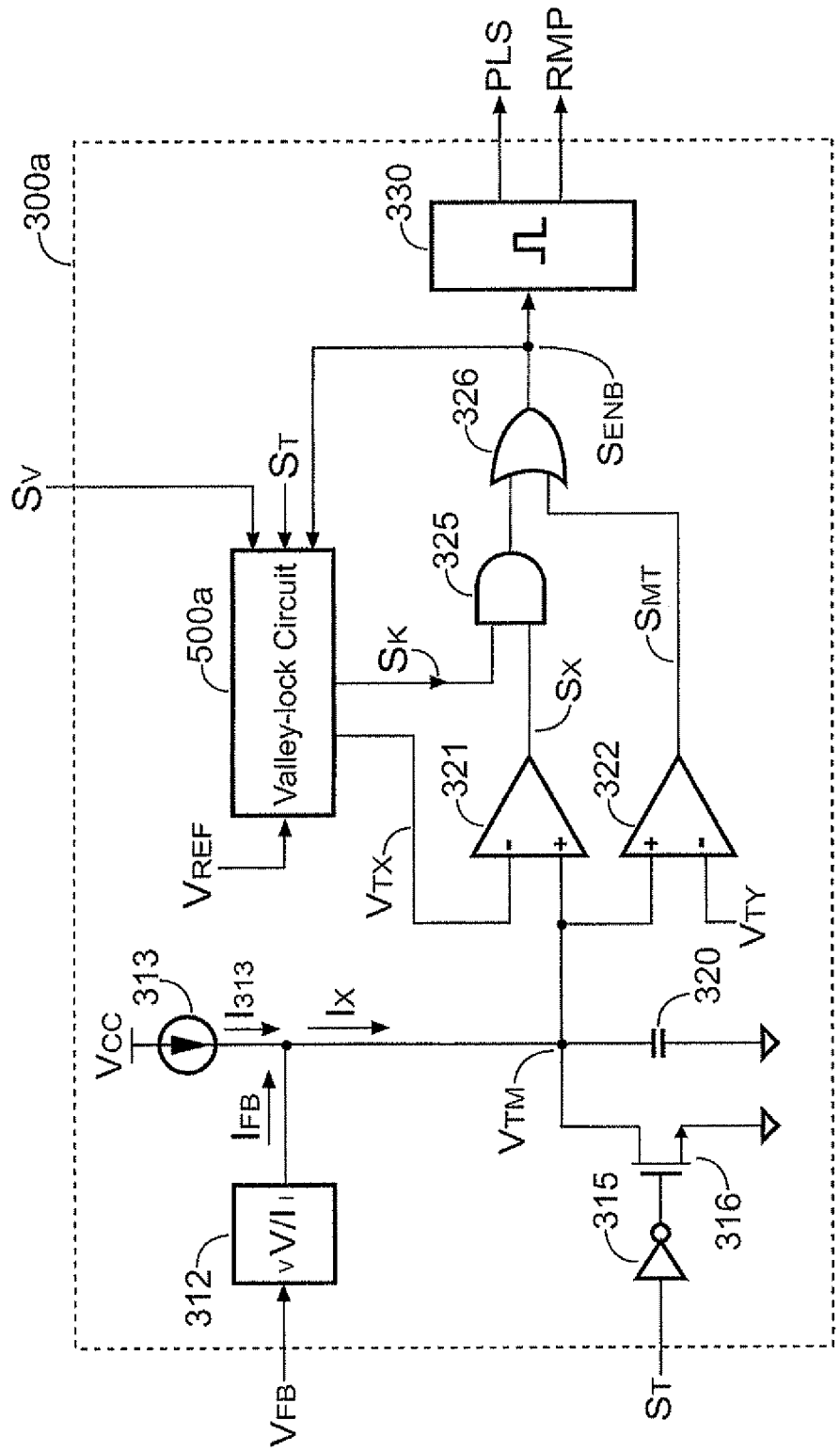
FIG. 5A shows an embodiment of a signal generator of the controller according to the present invention.

FIG. 5A shows an embodiment of the signal generator 300a of the controller 50 according to the present invention. The signal generator 300a comprises a timing circuit, a valley-lock circuit 500a, an enabling circuit and an oscillation circuit 330. The timing circuit comprises a voltage-to-current converter 312, a current source 313, an inverter 315, a transistor 316 and a capacitor 320. The voltage-to-current converter 312 receives the feedback signal $V_{FB}$ to generate a current $I_{FB}$. A current $I_{313}$ provided by the current source 313 is summed up with the current $I_{FB}$ to generate a charging current $I_X$. The capacitor 320 is connected between an output of the voltage-to-current converter 312 and the ground reference. The transistor 316 is connected in parallel with the capacitor 320. The discharging-time signal $S_T$ is coupled to discharge the capacitor 320 via the inverter 315 and the transistor 316. A magnitude of the charging current $I_X$ to the capacitor 320 is equal to the sum of the current $I_{313}$ and the current $I_{FB}$. The current $I_{313}$ ensures a minimum magnitude for the charging current $I_X$. The charging current $I_X$ charges the capacitor 320 to generate a timing signal $V_{TM}$ across the capacitor 320. The charging current $I_X$ to the capacitor 320 is thus decreased in response to a decrement of the feedback signal $V_{FB}$. Therefore, a charging period of the timing signal $V_{TM}$ increases in response to the decrement of the feedback signal $V_{FB}$. The enabling circuit comprises comparators 321, 322, an AND gate 325 and an OR gate 326. The comparator 321 compares the timing signal $V_{TM}$ with a threshold voltage $V_{TX}$ for enabling a controlling signal $S_X$ when the timing signal $V_{TM}$ is higher than the threshold voltage $V_{TX}$. The threshold voltage $V_{TX}$ determines a trip-point voltage of the timing signal $V_{TM}$. A first valley signal $S_K$ is further generated by the valley-lock circuit 500a. The comparator 322 enables a time-out signal $S_{MT}$ at its output when the timing signal $V_{TM}$ is higher than a threshold voltage $V_{TY}$. The threshold voltage $V_{TY}$ is higher than the threshold voltage $V_{TX}$. The time-out signal $S_{MT}$ is further coupled to generate an enabling signal $S_{ENB}$ via an input of the OR gate 326. The controlling signal $S_X$ and the first valley signal $S_K$ are supplied to inputs of the AND gate 325. An output of the AND gate 325 is connected to another input of the OR gate 326. An output of the OR gate 326 generates the enabling signal $S_{ENB}$. The valley-lock circuit 500a receives a reference voltage $V_{REF}$, the valley signal $S_V$, the discharging-time signal $S_T$ and the enabling signal $S_{ENB}$ to generate the controlling signal $S_X$ and the first valley signal $S_K$.

A period starting as the discharging-time signal $S_T$ is enabled and ending as the controlling signal $S_X$ is enabled is defined as an enabling delay time. The feedback signal $V_{FB}$ decreases in response to a decrement of the output load. The enabling delay time increases in response to the decrement of the feedback signal $V_{FB}$. The off-time of the switching signal $S_{PWM}$ is therefore increased in response to the decrement of the feedback signal $V_{FB}$. The oscillation circuit 330 receives the enabling signal $S_{ENB}$ for generating the pulse signal PLS and the ramp signal RMP.

Figure 5B:
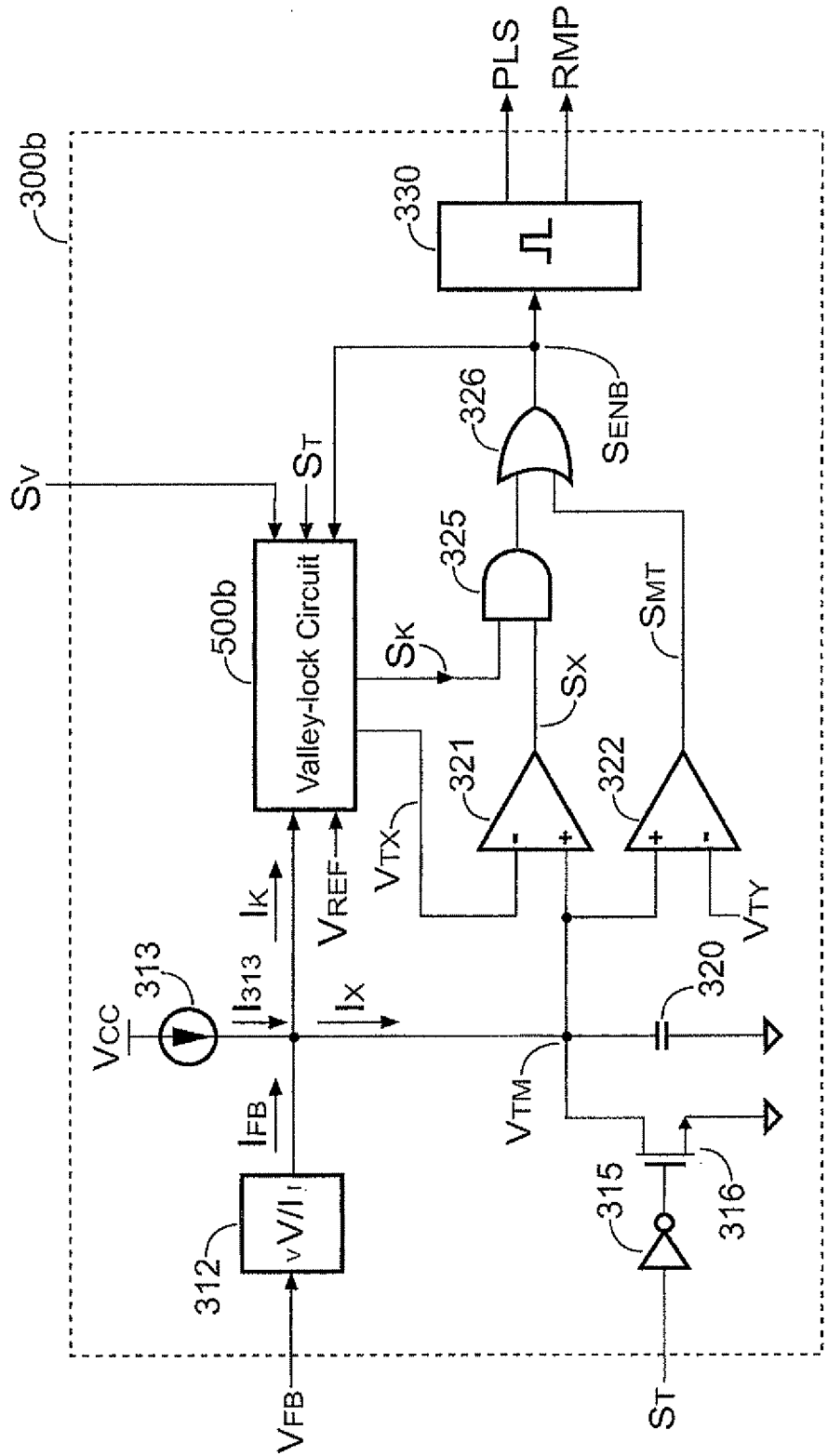
FIG. 5B shows another embodiment of the signal generator of the controller according to the present invention.

FIG. 5B shows an embodiment of a signal generator 300b of the controller 50 according to the present invention. Different to the embodiment in FIG. 5A, the signal generator 300b has a valley-lock circuit 500b generating the threshold voltage $V_{TX}$ and the first valley signal $S_K$ not only in response to the reference voltage $V_{REF}$, the valley signal $S_V$, the discharging-time signal $S_T$ and the enabling signal $S_{ENB}$ but also in response to a sinking current $I_K$ coupled to the output of the voltage-to-current converter 312.

Figure 6:
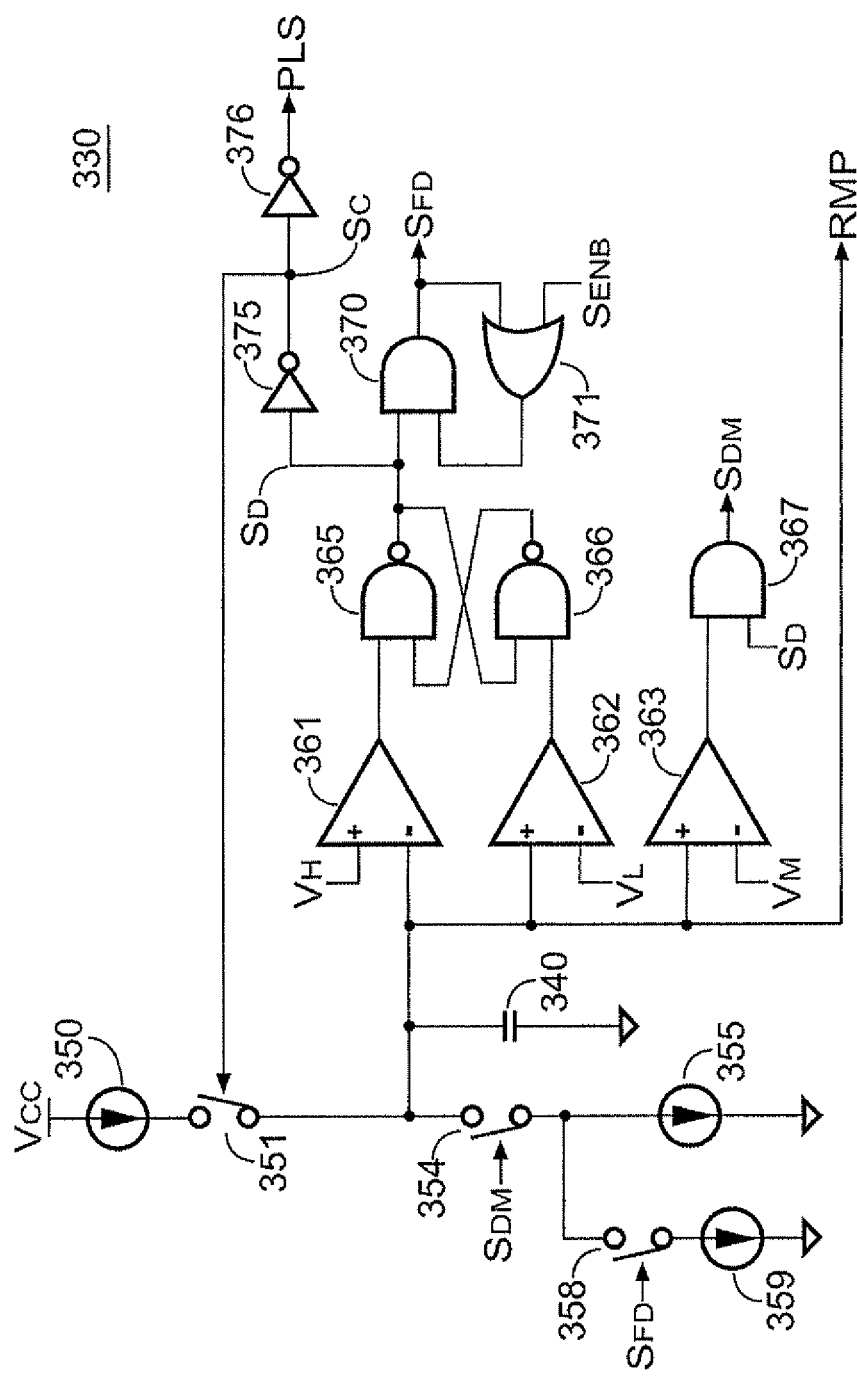
FIG. 6 shows an embodiment of an oscillation circuit of the signal generator according to the present invention.

FIG. 6 shows an embodiment of the oscillation circuit 330 of the signal generator 300 according to the present invention. The oscillation circuit 330 comprises a saw-tooth generator and a control circuit. The saw-tooth generator comprises current sources 350, 355, 359, a capacitor 340 and switches 351, 354, 358. The current source 350 is connected between the supply voltage $V_{CC}$ and a first terminal of the switch 351. A second terminal of the switch 351 is connected to a first terminal of the switch 354. The current source 355 is connected between a second terminal of the switch 354 and the ground reference. The switch 358 and the current source 359 are connected in series between the second terminal of the switch 354 and the ground reference. The capacitor 340 is connected between the second terminal of the switch 351 and the ground reference. The current source 350 is utilized to charge the capacitor 340 via the switch 351. The current source 355 is utilized to discharge the capacitor 340 via the switch 354. The ramp signal RMP is therefore generated across the capacitor 340. The switch 351 is controlled by a charging signal $S_C$. The switch 354 is controlled by a discharging signal $S_{DM}$. The switch 358 is controlled by a fast-discharging signal $S_{FD}$. The ramp signal RMP is thus generated across the capacitor 340. The control circuit comprises comparators 361, 362, 363, NAND gates 365, 366, AND gates 367, 370, inverters 375, 376 and an OR gate 371. The ramp signal RMP is supplied to a negative terminal of the comparator 361, a positive terminal of the comparator 362 and a positive terminal of the comparator 363. A positive terminal of the comparator 361 receives a threshold voltage $V_H$. A negative terminal of the comparator 362 receives a threshold voltage $V_L$. A negative terminal of the comparator 363 receives a threshold voltage $V_M$. The magnitude of the threshold voltage $V_H$ is greater than that of the threshold voltage $V_M$. The magnitude of the threshold voltage $V_M$ is greater than that of the threshold voltage $V_L$. NAND gates 365 and 366 form a latch circuit coupled to receive the output signals of the comparators 361 and 362. The latch circuit outputs a discharging signal $S_D$. The discharging signal $S_D$, which is a maximum frequency signal, determines a maximum frequency of the switching signal $S_{PWM}$. The discharging signal $S_D$ and an output signal of the comparator 363 are supplied to inputs of the AND gate 367 for generating the discharging signal $S_{DM}$.

The inverter 375 receives the discharging signal $S_D$ to generate the charging signal $S_C$. The inverter 376 receives the charging signal $S_C$ to generate the pulse signal PLS. The pulse signal PLS is enabled during a discharging period of the capacitor 340. The discharging signal $S_D$ is further supplied to an input of the AND gate 370 to generate the fast-discharging signal $S_{FD}$. The fast-discharging signal $S_{FD}$ and the enabling signal $S_{ENB}$ are supplied to inputs of the OR gate 371. An output of the OR gate 371 is connected to another input of the AND gate 370. Therefore, the enabling signal $S_{ENB}$ will trigger the fast-discharging signal $S_{FD}$ once the discharging signal $S_D$ is enabled. The fast-discharging signal $S_{FD}$ can be disabled only when the discharging signal $S_D$ is disabled. Since the current of the current source 359 is much higher than that of the current source 355, the capacitor 340 will be immediately discharged when the fast-discharging signal $S_{FD}$ is enabled. During the discharging period of the capacitor 340, the ramp signal RMP is held at the level of the threshold voltage $V_M$ until the enable signal $S_{ENB}$ activates the fast-discharging signal $S_{FD}$. Once the ramp signal RMP is lower than the threshold voltage $V_L$, the discharging signal $S_D$ will be disabled. The valley signal $S_V$ (the first valley signal $S_K$) and the enable signal $S_{ENB}$ are thus able to trigger the pulse signal PLS once the discharging signal $S_D$ is enabled. Therefore, the current of the current source 350, the capacitance of the capacitor 340 and the threshold voltages $V_H$, $V_M$, $V_L$ determine a maximum frequency of the discharging signal $S_D$, which also determines the maximum frequency of the switching signal $S_{PWM}$.

Figure 7:
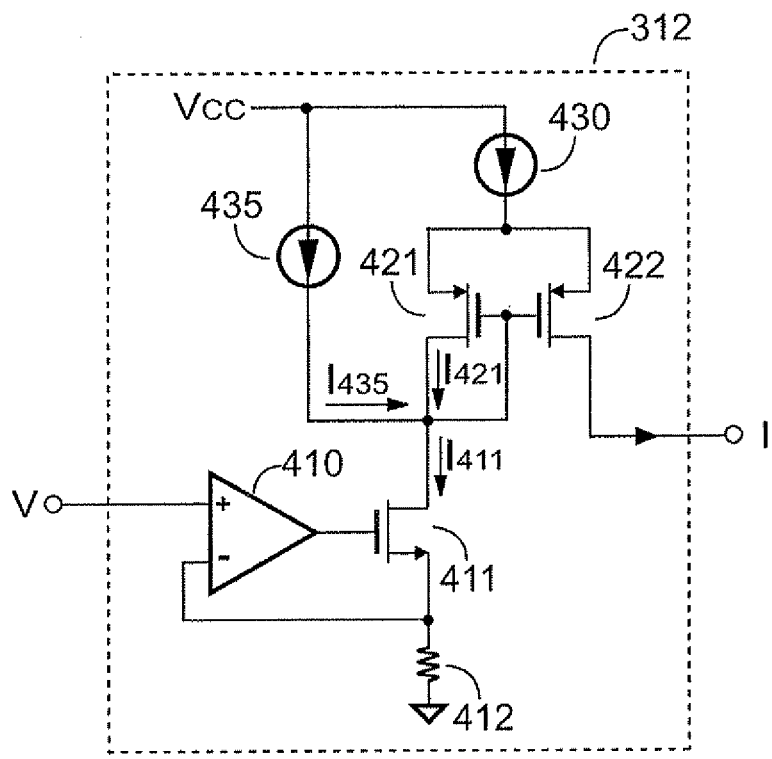
FIG. 7 shows a schematic of a voltage-to-current converter of the signal generator according to the present invention.

FIG. 7 shows a schematic of the voltage-to-current converter 312 of the signal generator 300 according to the present invention. The voltage-to-current converter 312 comprises current sources 430, 435, an operational amplifier 410, transistors 411, 421, 422 and a resistor 412. An input terminal V is connected to a positive terminal of the operational amplifier 410. An output terminal of the operational amplifier 410 is coupled to drive the transistor 411. A negative terminal of the operational amplifier 410 is connected to a source of the transistor 411. The resistor 412 is connected between the source of the transistor 411 and the ground reference. The current source 435 is connected between the supply voltage $V_{CC}$ and a drain of the transistor 411. A current $I_{411}$ flowing through the transistor 411 will flow through the resistor 412. Once the current $I_{411}$ is higher than a current $I_{435}$ sourced from the current source 435, a current $I_{421}$, which equals to the difference of the current $I_{411}$ and the current $I_{435}$) will flow via an input of the current mirror developed by transistors 421 and 422. A current generated at a terminal I, which is also an output of the current mirror, will be in proportion to the current $I_{421}$. A maximum current generated from the terminal I will be limited by the current source 430. The transistor 422 generates an output current to the output terminal I, which is corrected to an input voltage received at the input terminal V.

Figure 8:
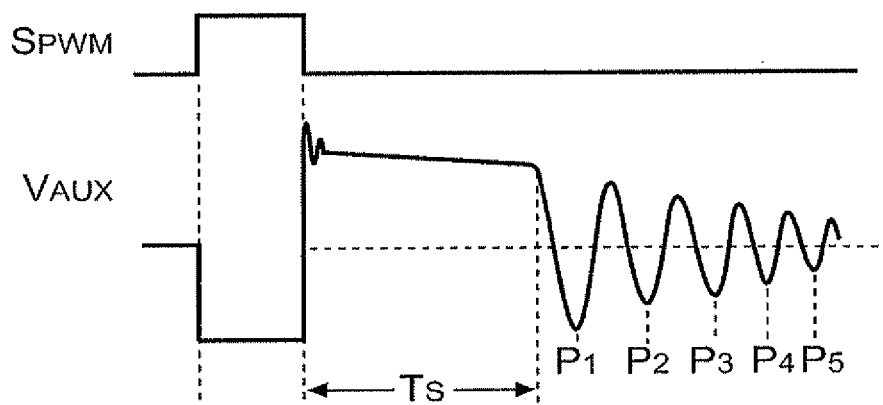
FIG. 8 shows waveforms of a switching signal and a reflected voltage of a transformer.

FIG. 8 shows waveforms of the switching signal $S_{PWM}$ and the reflected voltage $V_{AUX}$ of the transformer 10. The period $T_S$ represents the demagnetizing time of the transformer 10, which is correlated to the discharging-time signal $S_T$. To achieve quasi-resonant operation, the switching signal $S_{PWM}$ could be enabled at time point $P_1$, $P_2$, or $P_5$, depending on the load conditions. As the load is heavier, the switching signal $S_{PWM}$ could be enabled earlier, such as at the time point $P_1$ or $P_2$. As the load is lighter, the switching signal $S_{PWM}$ could be enabled later, such as at the time point $P_3$, $P_4$, or $P_5$.

Figure 9:
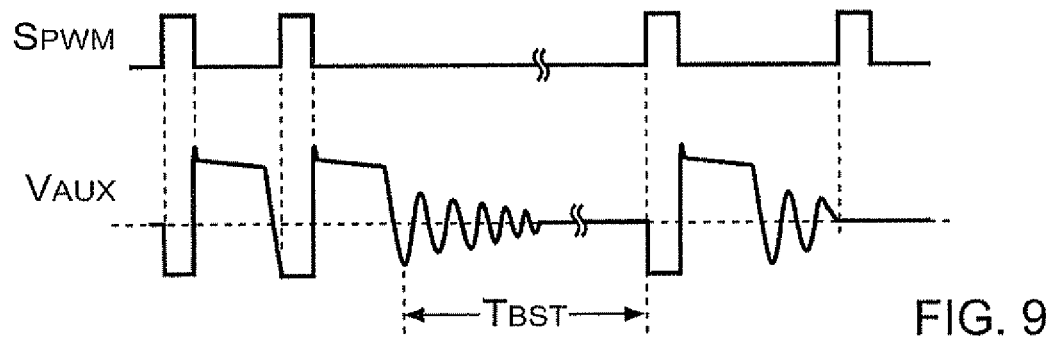
FIG. 9 shows key waveforms of the quasi-resonant power converter operated under various load condition.

FIG. 9 shows key waveforms of the quasi-resonant power converter operated under various load condition. In a shown burst period $T_{BST}$, the quasi-resonant power converter is operated at burst mode. The burst mode indicates that the operation of the quasi-resonant power converter has entered ultra-light-load condition. Once the burst signal $S_{BT}$ is activated (disabled), the switching signal $S_{PWM}$ will be disabled. That is, when the switching signal $S_{PWM}$ is not disabled by the burst signal $S_{BT}$, the switching signal $S_{PWM}$ could be enabled at time point $P_1$ or $P_2$ for reducing the switching loss of the transistor 20, which increases the efficiency of the quasi-resonant power converter.

Figure 10A:
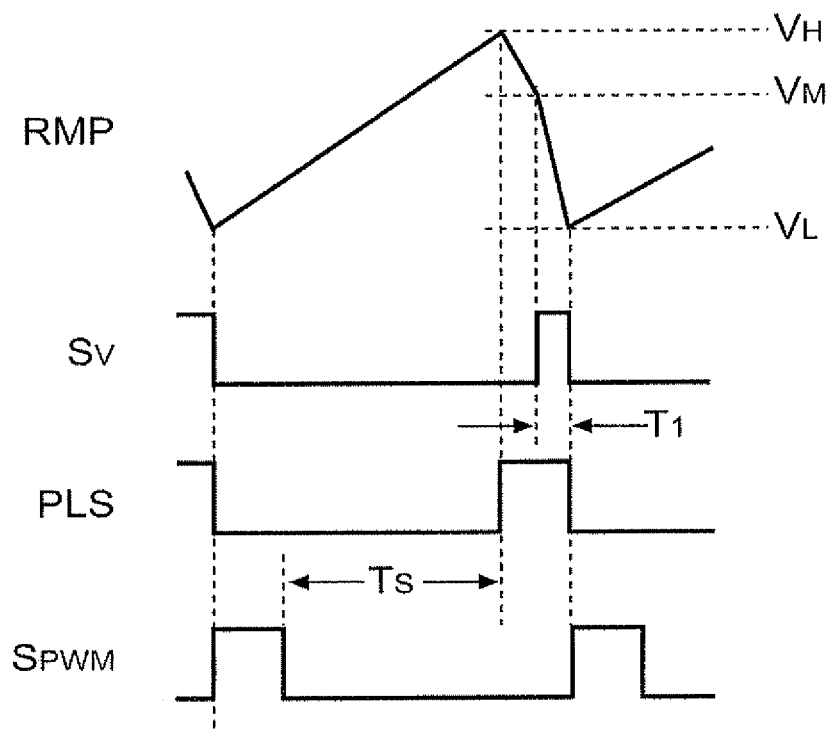
FIG. 10A shows key waveforms as the quasi-resonant power converter is operated at quasi-resonant and achieve valley switching operation under heavy load condition.

FIG. 10A shows key waveforms as the quasi-resonant power converter is operated at quasi-resonant and achieve valley switching operation under heavy load condition. The switching signal $S_{PWM}$ is enabled at the time point $P_1$ shown in FIG. 8.

Figure 10B:
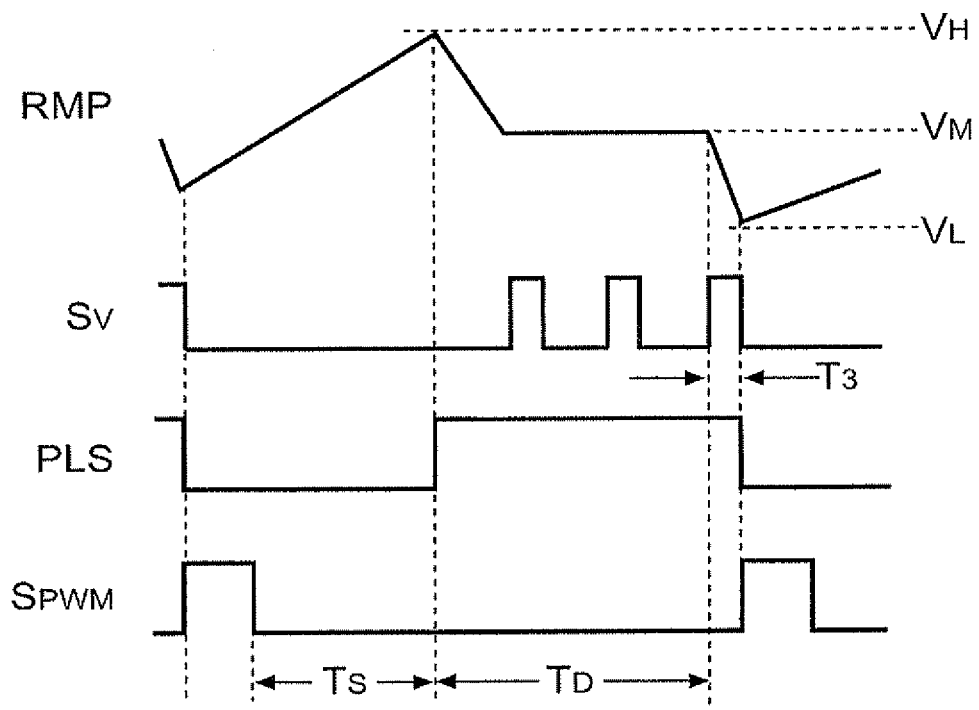
FIG. 10B shows key waveforms as the quasi-resonant power converter is operated at quasi-resonant and achieve extended valley switching operation under light load condition.

FIG. 10B shows key waveforms as the quasi-resonant power converter is operated at quasi-resonant and achieve extended valley switching operation under light load condition. The switching signal $S_{PWM}$ is, for example, enabled at the time point $P_3$ shown in FIG. 8.

Figure 11:
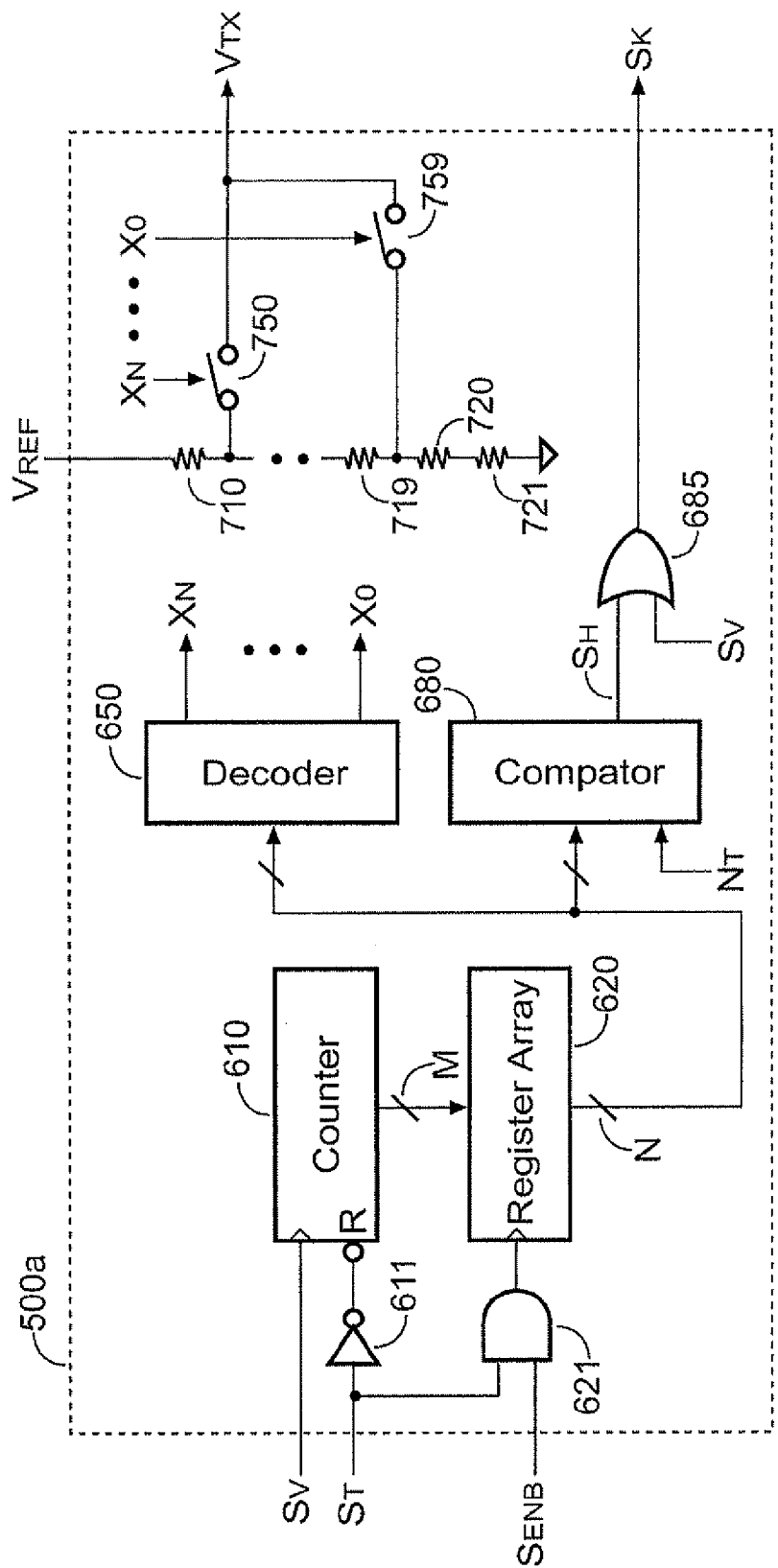
FIG. 11 shows an embodiment of a valley-lock circuit of the signal generator in FIG. 5A.

FIG. 11 shows an embodiment of a valley-lock circuit 500$a$ of the signal generator 300$a$ according to the present invention. The valley-lock circuit 500$a$ comprises a counter 610, a register array 620, an inverter 611, an AND gate 621, an OR gate 685, a decoder 650, a comparison circuit 680 and a threshold generator. A counter 610 counts a code M in response to the valley signal $S_V$. The discharging-time signal $S_T$ is coupled to reset the counter 610 via the inverter 611. The enabling signal $S_{ENB}$ and the discharging-time signal $S_T$ are supplied to inputs of the AND gate 621 to generate a shift signal to shift the code M from the counter 610 to the register array 620. The register array 620 thus generates a code N in response to the code M. According to the code N provided by the register array 620, the decoder 650 generates control signals $X_N$~$X_0$. The reference voltage $V_{REF}$ is provided to a voltage divider developed by resistors 710, 719, 720, and 721. The voltage divider is coupled to switches 750~759. The control signals $X_N$~$X_0$ are coupled to control the switches 750~759 for programming the threshold voltage $V_{TX}$. The magnitude of the threshold voltage $V_{TX}$ is increased in response to the increment of the code N. The hysteresis characteristic of the enabling signal $S_{ENB}$ and the controlling signal $S_X$ is thus provided by programming the trip-point voltage of the timing signal $V_{TM}$.

The variation of the code N also represents the variation of the output load. As the output load reduces, the value of the code N will increase, and vice versa. The enabling delay time is thus increased slightly in response to the increment of the code N. This therefore provides a hysteresis for the valley switching operation. This hysteresis will lock the valley switching operation at the valley number N for a while until the feedback signal $V_{FB}$ from the feedback loop changes. This valley-lock function is beneficial to reduce the acoustic noise of the transformer 10 during the valley number of the valley switching operation is changing.

Furthermore, the register array 620 is coupled to a comparator 680 to generate an overflow signal $S_H$ when the value of the code N is larger than a value of a threshold code $N_T$. The overflow signal $S_H$ and the valley signal $S_V$ are connected to inputs of the OR gate 685 to generate the first valley signal $S_K$. Therefore, the state of the first valley signal $S_K$ is the same as that of the valley signal $S_V$ when the value of the code N is lower than that of the threshold code $N_T$. The valley signal $S_K$ becomes logic-high when the value of the code N is greater than that of the threshold code $N_T$.

During an ultra-light load condition, the value of the code N will be greater than the threshold code $N_T$. This will make the overflow signal $S_H$ become logic-high and therefore make the first valley signal $S_K$ become logic-high via the OR gate 685. After the overflow signal $S_H$ is enabled (logic-high), the turning-on of the switching signal $S_{PWM}$ will no longer be synchronized with the valley signal $S_V$ and the switching frequency of the switching signal $S_{PWM}$ will be linearly decreased in response to a decrement of the feedback signal $V_{FB}$.

Figure 12A:
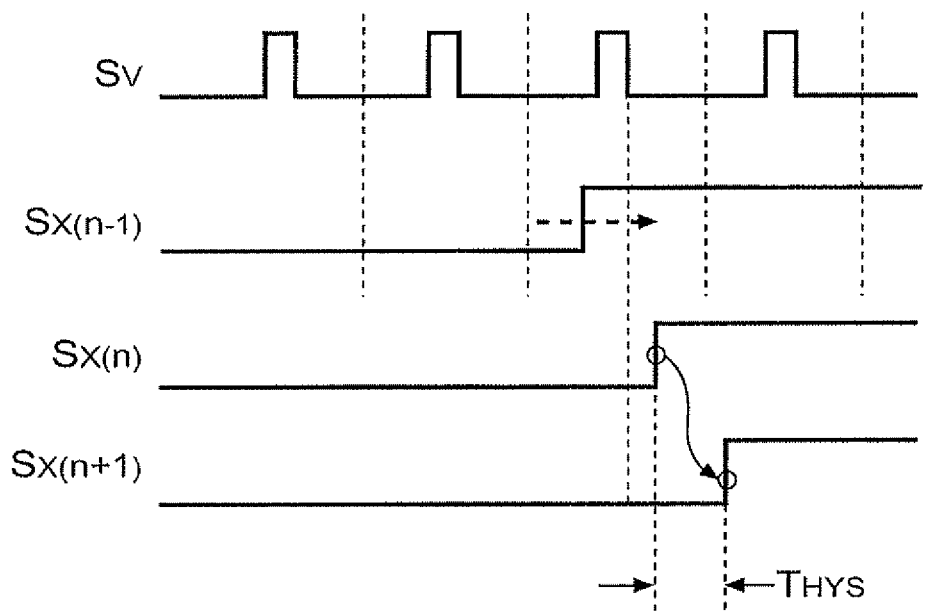
FIG. 12A shows the waveforms of a valley signal and a controlling signal when an output load decreases.

FIG. 12A shows the waveforms of the valley signal $S_V$ and the controlling signal $S_X$. When the output load decreases, the valley number n, which is correlated to the code N, is increased, for example, from 3 to 4 ([$S_X$(n−1)]→[$S_X$(n)]). A hysteresis period $T_{HYS}$ will be automatically generated for the next switching cycle ([$S_X$(n+1)].

Figure 12B:
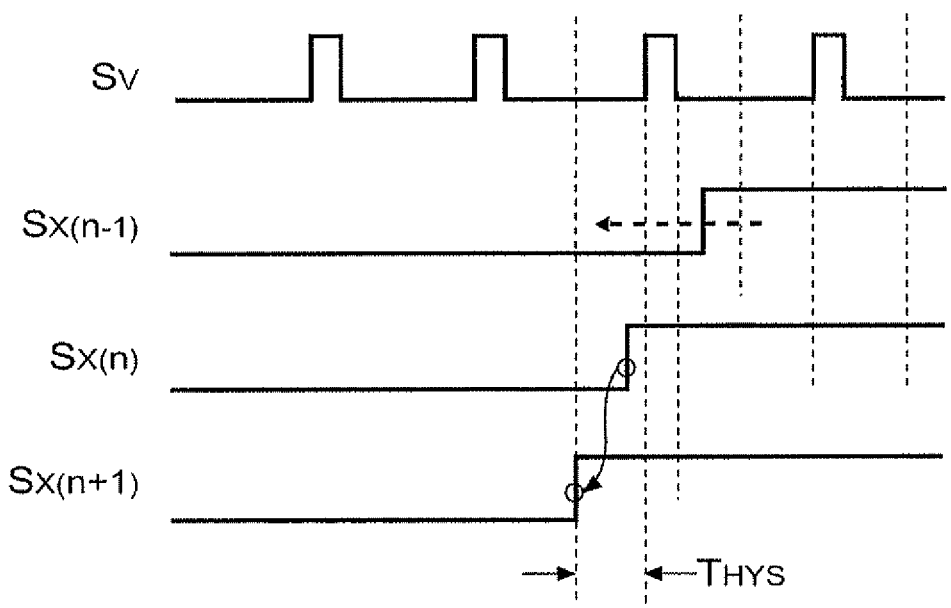
FIG. 12B shows the waveforms of a valley signal and a controlling signal when the output load increases.

FIG. 12B shows the waveforms of the valley signal $S_V$ and the first-enable signal $S_X$. When the output load increases, the valley number n, which is correlated to the code N, is decreased, for example, from 4 to 3 ([$S_X$(n−1)]→[$S_X$(n)]). The hysteresis period $T_{HYS}$ will be generated for the next switching cycle ([$S_X$(n+1)].

Figure 13:
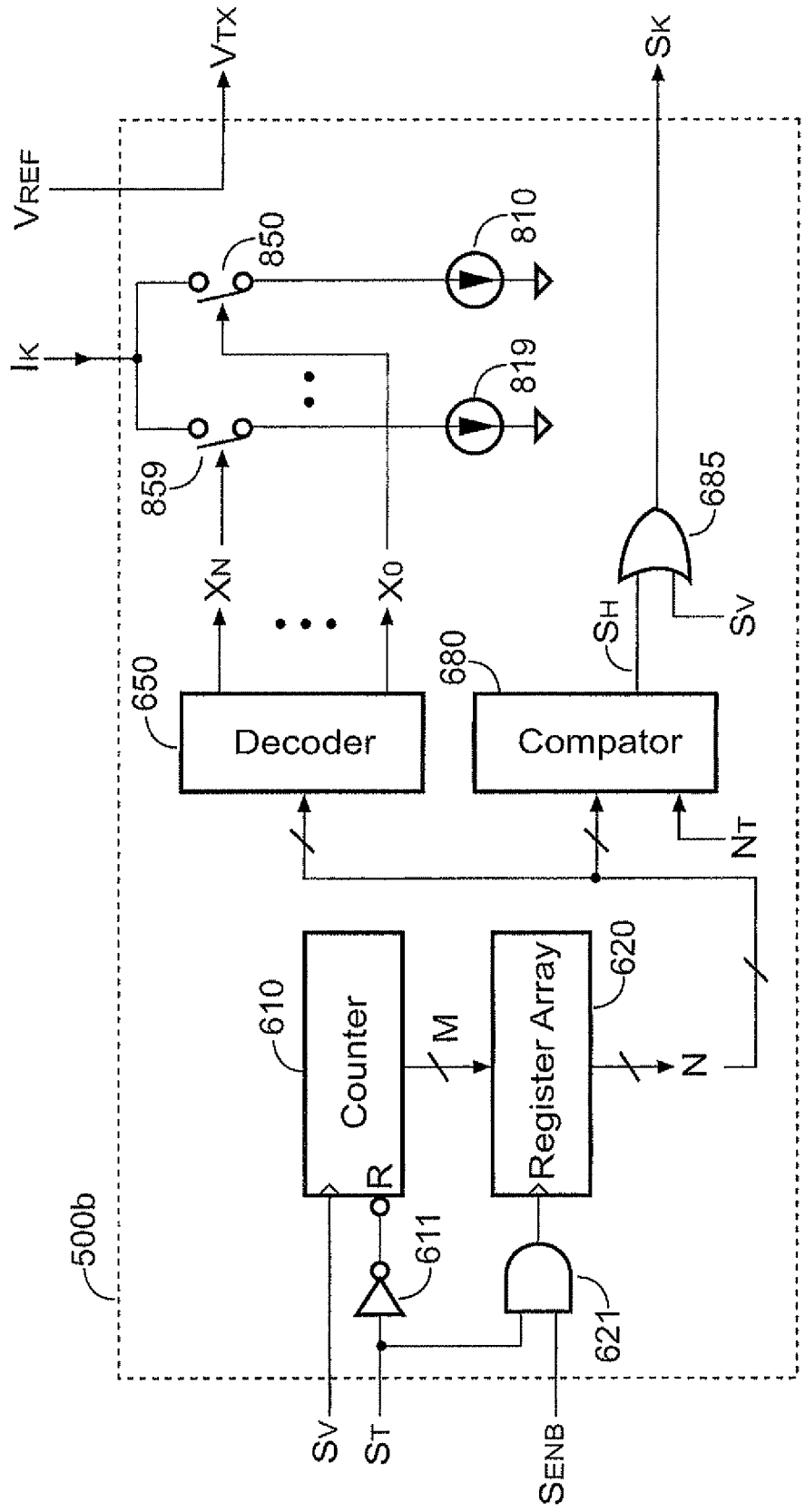
FIG. 13 shows an embodiment of a valley-lock circuit of the signal generator in FIG. 5B.

FIG. 13 shows another embodiment of a valley-lock circuit 500$b$ of the signal generator 300$b$ according to the present invention. The valley-lock circuit 500$b$ comprises a counter 610, a register array 620, an inverter 611, an AND gate 621, an OR gate 685, a decoder 650, a comparison circuit 680 and a programmable current sink. The threshold voltage $V_{TX}$ in this embodiment is a fixed value which equal to the reference voltage $V_{REF}$. Current sources 810~819 are coupled to the switches 850~859 to form the programmable current sink. The control signals $X_N$~$X_0$ are coupled to control the switches 850~859 for drawing the sinking current $I_K$. The sinking current $I_K$ is coupled to modulate the charging current $I_X$ (See FIG. 5B). The magnitude of the charging current $I_X$ decreases in response to the increment of the code N. The charging current $I_X$ to the capacitor 320 is thus decreased in response to the increment of the code N which also represents the valley number n of the reflected voltage $V_{AUX}$. Therefore, the charging time of the timing signal $V_{TM}$ will increase in response to the increment of the valley number of the reflected voltage $V_{AUX}$. The hysteresis characteristic of the enable signal $S_{ENB}$ and the controlling signal $S_X$ is generated by modulating a time constant of the timing circuit.

Figure 14:
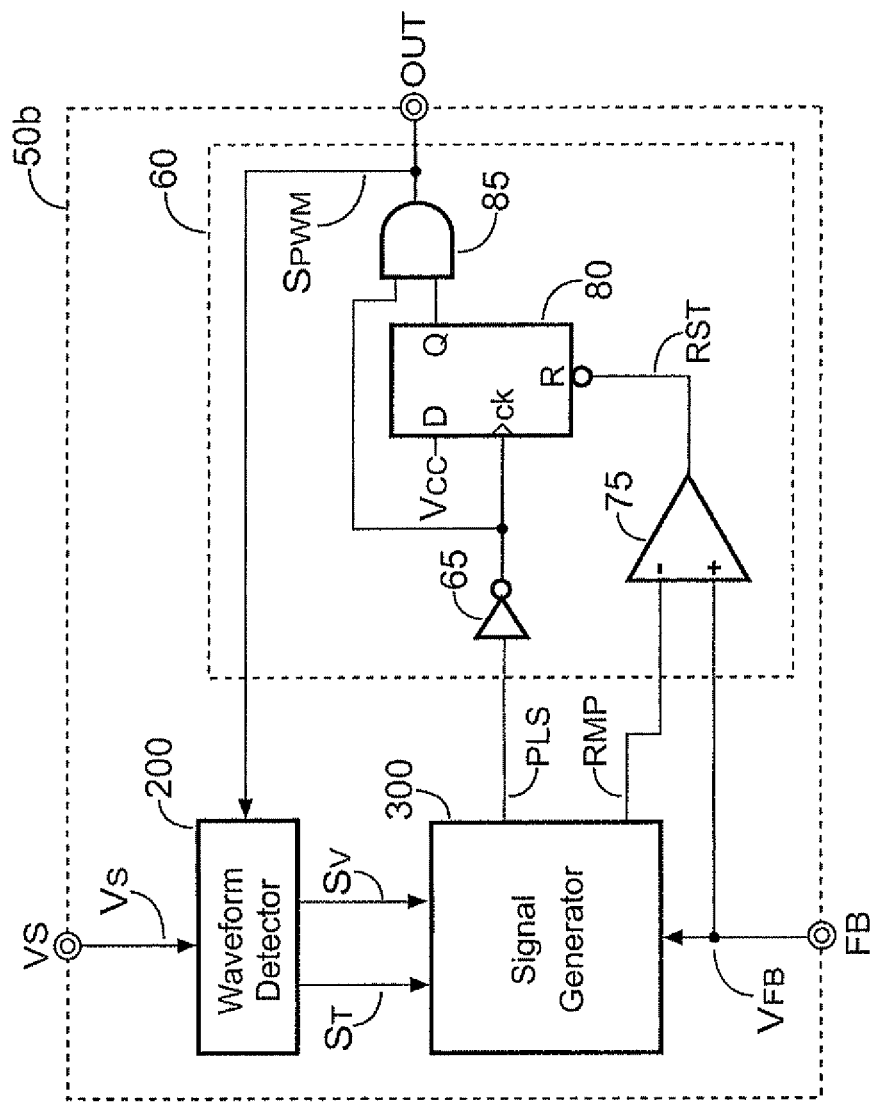
FIG. 14 shows another embodiment of the controller of the quasi-resonant power converter according to the present invention.

FIG. 14 shows another embodiment of the controller 50 of the quasi-resonant power converter according to the present invention. The controller in this embodiment is denoted as 50$b$. Different to the controller 50$a$ shown in FIG. 2A, the burst circuit 100 and the AND gate 76 are not included. The flip-flop 80 is reset by the output of the comparator 75 directly.

What is claimed is:

1. A switching controller for a power converter, comprising:
   a PWM circuit, generating a switching signal coupled to switch a transformer of said power converter, wherein a feedback signal is coupled to control and disable said switching signal;
   a detection circuit, coupled to said transformer via a resistor for generating a valley signal in response to a waveform of said transformer, wherein said valley signal represents a valley number of said waveform;
   a signal generation circuit, coupled to receive said feedback signal and said valley signal for generating an enabling signal, wherein said enabling signal has a hysteresis characteristic to lock said valley number of said waveform;
   an oscillation circuit, generating a maximum frequency signal, wherein said maximum frequency signal associated with said enabling signal generates a turning-on signal, said turning-on signal is coupled to enable said switching signal;
   wherein said feedback signal is correlated to an output load of said power converter, a maximum frequency of said turning-on signal is limited.

2. The switching controller as claimed in claim 1, further comprising a valley-lock circuit with a timer coupled to receive said valley signal for generating a hysteresis for said enabling signal.

3. The switching controller as claimed in claim 1, further comprising a burst circuit coupled to receive said feedback signal for generating a burst signal to disable said switching signal, said burst circuit including a hysteresis threshold signal for generating said burst signal.

4. The switching controller as claimed in claim 1, wherein an off-time of said switching signal is increased in response to an decrement of said feedback signal.

5. A method for controlling a QR (quasi-resonant) power converter, comprising:

generating a switching signal to switch a transformer of said power converter;

generating a reset signal in response to a feedback signal to disable said switching signal;

generating a valley signal in response to valley numbers of a waveform obtained from said transformer during an off-time of said switching signal;

generating a maximum frequency signal;

generating an enabling signal in response to said feedback signal and said valley signal, wherein said enabling signal has a hysteresis characteristic to lock said valley numbers of said waveform;

generating a turning-on signal in response to said enabling signal and said maximum frequency signal, wherein said turning-on signal is coupled to turn on said switching signal; said feedback signal is correlated to an output load of said power converter.

6. The method as claimed in claim 5, wherein said valley signal is generated via a resistor coupled to said transformer.

7. The method as claimed in claim 5, further comprising:
providing a hysteresis characteristic for said enabling signal by a timer;
wherein said timer provides said hysteresis characteristic in response to said valley signal.

8. The method as claimed in claim 7, wherein said timer generates said hysteresis by programming a threshold or a time-constant of said timer.

9. The method as claimed in claim 5, further comprising:
generating an overflow signal in response to said valley signal;
wherein said turning-on signal is generated in response to said feedback signal when said overflow signal is generated without being synchronized with said valley signal.

10. The method as claimed in claim 5, further comprising:
generating a burst signal in response to said feedback signal; said burst signal is coupled to disable said switching signal; wherein said burst signal is generated in response to said feedback signal and a hysteresis-threshold signal for generating said burst signal.

11. The method as claimed in claim 5, wherein said off-time of said switching signal is increased in response to a decrement of said feedback signal.

12. A method for switching a power converter, comprising:
generating a switching signal coupled to switch a transformer of said power converter;
generating a reset signal in response to a feedback signal;
generating a valley signal in response to valley numbers of a waveform obtained from said transformer during an off-time of said switching signal;
generating a turning-on signal in response to said feedback signal and said valley signal; and
providing a hysteresis characteristic for said turning-on signal, wherein said reset signal is coupled to disable said switching signal; said turning-on signal is coupled to enable said switching signal; said feedback signal is correlated to an output load of said power converter; said hysteresis characteristic is provided by a timing circuit in response to said valley signal.

13. The method as claimed in claim 12, further comprising:
generating a timing signal to generate said turning-on signal, wherein a period of said timing signal is increased in response to a decrement of said feedback signal.

14. The method as claimed in claim 12, wherein said valley signal is generated via a resistor coupled to said transformer.

15. The method as claimed in claim 12, further comprising:
generating an overflow signal in response to said valley signal; said overflow signal is coupled to disable a valley switching operation of said power converter; wherein said turning-on signal is generated in response to said feedback signal when said overflow signal is generated without being synchronized by said valley signal.

16. The method as claimed in claim 12, further comprising:
generating a burst signal in response to said feedback signal, said burst signal is coupled to disable said switching signal, wherein said burst signal is generated in response to said feedback signal and a hysteresis-threshold signal.

* * * * *